United States Patent
Andersen et al.

(10) Patent No.: US 12,173,685 B2
(45) Date of Patent: Dec. 24, 2024

(54) PITCH SYSTEM FOR A WIND TURBINE BLADE

(71) Applicant: Vestas Wind Systems A/S, Aarhus N (DK)

(72) Inventors: Lasse Godballe Andersen, Hjortshøj (DK); Erik Garde, Randers SV (DK); Kris Kristensen Riisager, Støvring (DK)

(73) Assignee: Vestas Wind Systems A/S, Aarhus (DK)

( * ) Notice: Subject to any disclaimer, the term of this patent is extended or adjusted under 35 U.S.C. 154(b) by 0 days.

(21) Appl. No.: 18/559,349

(22) PCT Filed: Mar. 7, 2022

(86) PCT No.: PCT/DK2022/050037
§ 371 (c)(1),
(2) Date: Nov. 7, 2023

(87) PCT Pub. No.: WO2022/237945
PCT Pub. Date: Nov. 17, 2022

(65) Prior Publication Data
US 2024/0240608 A1    Jul. 18, 2024

(30) Foreign Application Priority Data
May 10, 2021   (DK) .......................... PA 2021 70227

(51) Int. Cl.
*F03D 1/06* (2006.01)
(52) U.S. Cl.
CPC ......... *F03D 1/0667* (2023.08); *F03D 1/0658* (2013.01); *F05B 2260/50* (2013.01); *F05B 2260/79* (2013.01)

(58) Field of Classification Search
CPC .... F03D 1/0667; F03D 1/0664; F03D 1/0669; F03D 1/0658; F03D 80/70; F03D 80/701; F03D 7/0224; F05B 2260/50
See application file for complete search history.

(56) References Cited

U.S. PATENT DOCUMENTS 9,121,385 B2    9/2015  Andersen et al.
9,631,605 B2 *  4/2017  Neubauer ............. F03D 1/0658
(Continued)

FOREIGN PATENT DOCUMENTS

CN      207777065 U    8/2018
DE    202015001902 U1  6/2016
(Continued)

OTHER PUBLICATIONS

Danish Patent and Trademark Office, examination report issued in corresponding DK Application No. PA 2021 70227, dated Oct. 25, 2021.
(Continued)

*Primary Examiner* — Justin D Seabe
(74) *Attorney, Agent, or Firm* — Wood Herron & Evans LLP

(57) ABSTRACT

A pitch system for rotating a blade of a wind turbine relative to a hub. The pitch system comprises a blade bearing including an inner bearing ring and an outer bearing ring, wherein the outer bearing ring is rotatable relative to the inner bearing ring, and an actuator system configured to control relative rotational movement between the inner bearing ring and outer bearing ring, comprising. The actuator system comprises a first load transfer beam arrangement spanning at least first and second fixing positions associated with the inner bearing ring, a second load transfer beam arrangement spanning at least first and second fixing positions associated with the outer bearing ring, and a first linear actuator coupled between the first load transfer beam
(Continued)

arrangement and the second load transfer beam arrangement. A benefit of the pitch system of the invention is that it achieves a reduction in mass yet retains a stiff connection between the hub and an associated blade. Therefore, larger and heavier blades can be coupled to the pitch system whilst mitigating a proportional increase in mass of the pitch system.

26 Claims, 5 Drawing Sheets

(56) References Cited

U.S. PATENT DOCUMENTS

| | | | |
|---|---|---|---|
| 10,612,516 B2* | 4/2020 | Ebbesen | F03D 7/0224 |
| 11,434,867 B2* | 9/2022 | Bescos Grillo | F03D 7/0224 |
| 11,946,448 B2* | 4/2024 | Veldkamp | G01B 11/24 |
| 2015/0003986 A1 | 1/2015 | Minadeo et al. | |
| 2016/0312766 A1* | 10/2016 | Rasmussen | F03D 13/30 |
| 2018/0156203 A1* | 6/2018 | Christensen | F03D 80/70 |
| 2020/0149515 A1* | 5/2020 | Buch-Lorentsen | F03D 1/0691 |

FOREIGN PATENT DOCUMENTS

| | | |
|---|---|---|
| EP | 2309120 A2 | 4/2011 |
| EP | 3653870 A1 | 5/2020 |
| WO | 2012069062 A1 | 5/2012 |

OTHER PUBLICATIONS

International Searching Authority, International Search Report and Written Opinion issued in corresponding PCT Application No. PCT/DK2022/050037, mailed May 30, 2022.

* cited by examiner

PITCH SYSTEM FOR A WIND TURBINE BLADE

TECHNICAL FIELD

The present invention relates generally to wind turbines, to a pitch system for use in such wind turbines, and to a pitch ring assembly.

BACKGROUND

Wind turbines typically include a rotor with large blades driven by the wind. The blades convert the kinetic energy of the wind into rotational mechanical energy. Typically, the mechanical energy is transferred via a drive train to a generator, which then converts the energy into electrical power.

Most modern wind turbines control power output by pitching the blades relative to the wind. Therefore, each blade is mounted to a hub by a pitch system that allows relative rotational movement between the blade and the hub. The pitch system comprises a pitch bearing, which typically includes concentric inner and outer bearing rings. One of the bearing rings (either the inner or the outer ring) is attached to the blade and the other is attached to the hub.

The pitch system also includes a drive system comprising one or more pitch drive devices such as electric motors or hydraulic or electric linear actuators. The drive devices are used to turn the bearing ring attached to the blade relative to the bearing ring attached to the hub in order to adjust the pitch of the blade by turning the blade about its longitudinal axis.

An example of a pitch system for a wind turbine blade is described in the applicant's prior PCT application WO 2012/069062. FIG. 1 shows an exploded perspective view of the prior art pitch system described in WO 2012/069062. Referring to FIG. 1, the pitch system 20 includes a bearing 22, first and second coupling members 24, 26, and a drive system 28. More specifically, the bearing 22 includes an inner bearing ring 30 mounted to the hub 6 and an outer bearing ring 32 mounted to the blade. The first coupling member 24 is positioned between the hub 6 and the inner bearing ring 30. The second coupling member 26 is positioned between the blade and outer bearing ring 32. The drive system 28 comprises hydraulic actuators 34, which are connected to the first and second coupling members 24, 26 so that the drive system 28 can rotate the inner bearing ring 30 relative to the outer bearing ring 32 and thereby pitch the blade relative to the hub 6.

The first and second coupling members 24, 26 shown in FIG. 1 each comprise a pitch ring for attaching to a respective bearing ring 30, 32. The first coupling member 24 further includes a plate, whilst the second coupling member 26 includes a cross-beam. The plate and cross-beam of the respective coupling members 24, 26 provide mounting points for the hydraulic actuators 34. In addition to providing mounting points for the actuators 34, one or both of the coupling members 24, 26 may be designed to alleviate loads in the bearing rings 30, 32, for example to ensure that loads are distributed evenly around the circumferences of the bearing rings 30, 32. Notably, for example, the plate-like first coupling member 24 is generally circular and spans the central region of the inner bearing ring 30, to provide support to the inner bearing ring 30 to guard against ovalisation due to forces exerted on the inner bearing ring 30 during use. This prevents excessive fatigue loading of the hub casting.

Over time there has been a significant increase in the overall size of wind turbine blades because of the desire to capture more of the available energy from the wind. For instance, the root diameter of existing utility-scale wind turbine blades is in excess of 4.5 metres, and this is set to increase further in the future as blade sizes become ever larger. Larger blades require larger pitch system components, such as bearing rings and actuators, in order to support the blades and control pitching movement. However, this increase in size of pitch system components is generally accompanied by a corresponding increase in the mass. With the general aim of mass reduction of components, it is desirable to avoid increasing the mass of the pitch system in proportion with increasing the blade size. It is against this background that the invention has been devised.

SUMMARY OF THE INVENTION

In accordance with one aspect of the invention, there is provided a pitch system for rotating a blade of a wind turbine relative to a hub. The pitch system comprises a blade bearing including an inner bearing ring and an outer bearing ring, wherein the outer bearing ring is rotatable relative to the inner bearing ring, and an actuator system configured to control relative rotational movement between the inner bearing ring and outer bearing ring, comprising. The actuator system comprises a first load transfer beam arrangement spanning at least first and second fixing positions associated with the inner bearing ring, a second load transfer beam arrangement spanning at least first and second fixing positions associated with the outer bearing ring, and a first linear actuator coupled between the first load transfer beam arrangement and the second load transfer beam arrangement.

A benefit of the pitch system of the invention is that it achieves a reduction in mass yet retains a stiff connection between the hub and an associated blade. Therefore, larger and heavier blades can be coupled to the pitch system whilst mitigating a proportional increase in mass of the pitch system.

In one embodiment, the inner bearing ring is configured to be mounted to the hub and the outer bearing ring is configured to be mounted to the blade, either directly or indirectly by means of an intermediate component. Configuring the pitch system such that the blade attaches to the outer bearing ring confers certain advantages. Principally, for a given blade root diameter, which is usually associated with a given blade length, the radially inward inner bearing ring means that the hub can be made more compact because the diameter of the inner bearing ring is smaller.

In one embodiment, first load transfer beam arrangement crosses the second load transfer beam arrangement, when viewed along a rotational axis of the pitch system. The first load transfer beam may extend substantially linearly between the first and second fixing positions. The second load transfer beam may also extend substantially linearly between the first and second fixing positions. In this configuration, the two beam arrangements may appear to intersect, or cross over each other, in the geometric centre of the bearing rings. This provides a benefit since it a sensor platform can be mounted between the beam arrangements. It is particularly convenient if the sensor platform is configured at the centre, as it may pick up pure rotational movement without being affected by lateral movement between the blades.

In one embodiment the linear actuator has an actuator body mounted to the first load transfer beam arrangement and an actuator rod connected to the second load transfer beam arrangement. This provides a relatively simple coupling between the second load transfer beam arrangement and the linear actuator. In order that the linear actuator can take up a degree of elastic deformation between the inner and outer bearing rings, in one embodiment the linear actuator may be coupled to one or more of the first and second load transfer beam arrangements by a flexible coupling, and optionally a spherical bearing. Such a configuration retains the stiffness in the coupling, but allows compliance between the actuator and the bearing rings.

In one embodiment, the first load transfer beam arrangement comprises a first beam section and a second beam section, which may be parallel to one another. This provides a secure mounting yoke for the actuator as it may be sandwiched between the two beam sections.

Advantageously, a sensor system may be coupled between the first load transfer beam arrangement and the second load transfer beam arrangement and configured to measure relative rotational movement between them. This avoids the need for a transducer or encoder system coupled between the inner and outer bearing rings which is generally a more complex arrangement.

Figure 2:
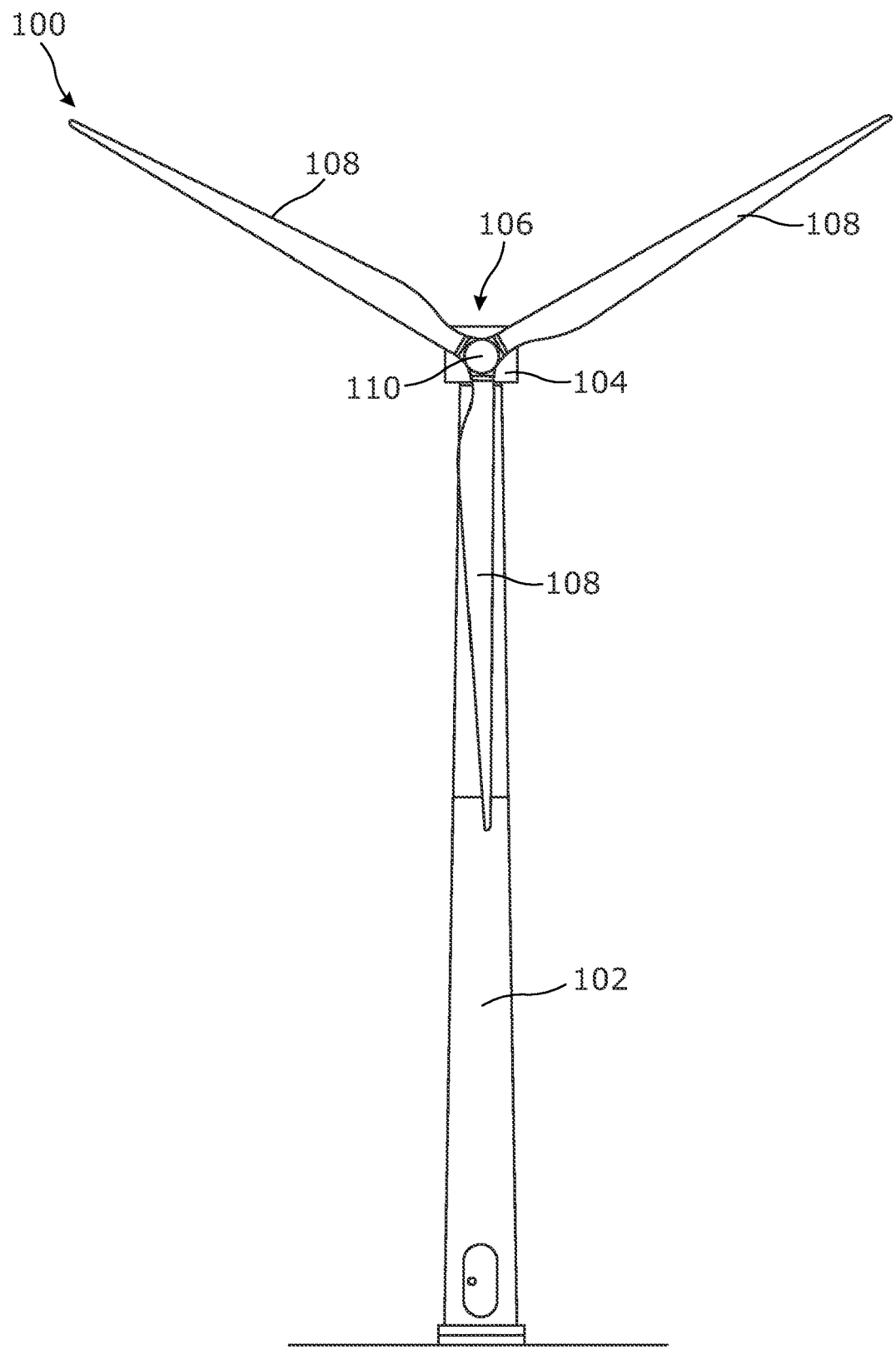
Figure 3:
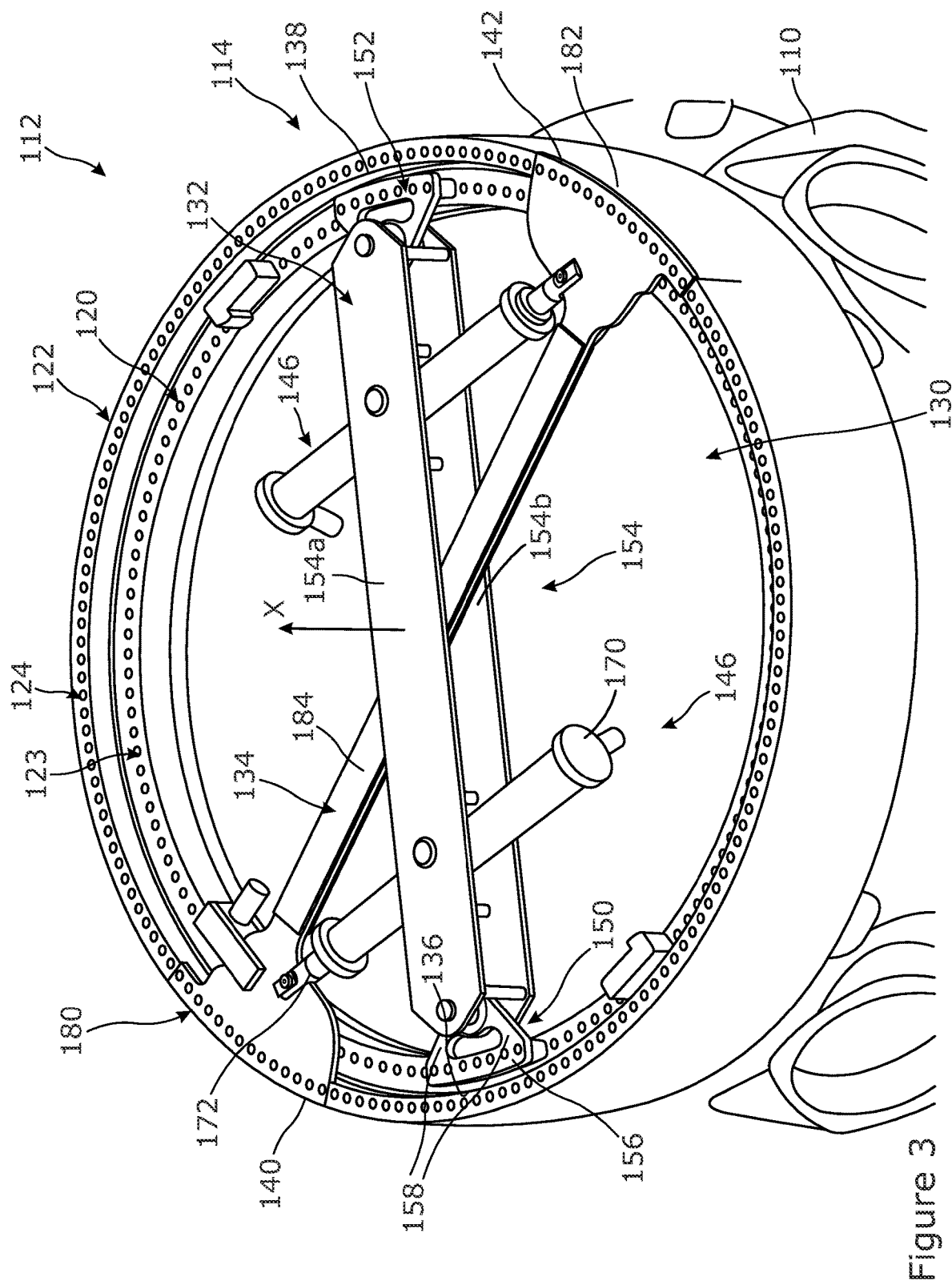
Figure 4:
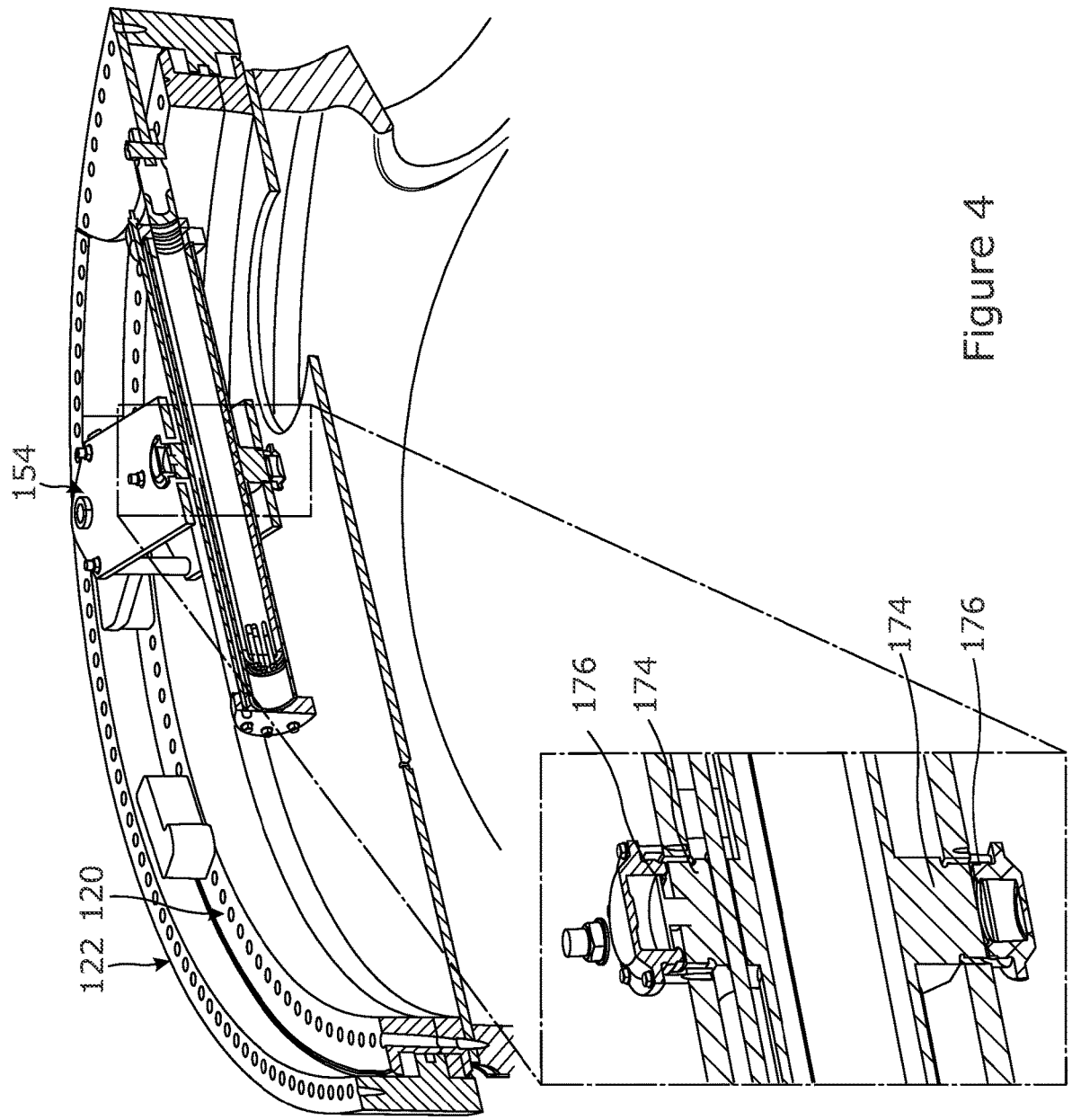
Figure 5:
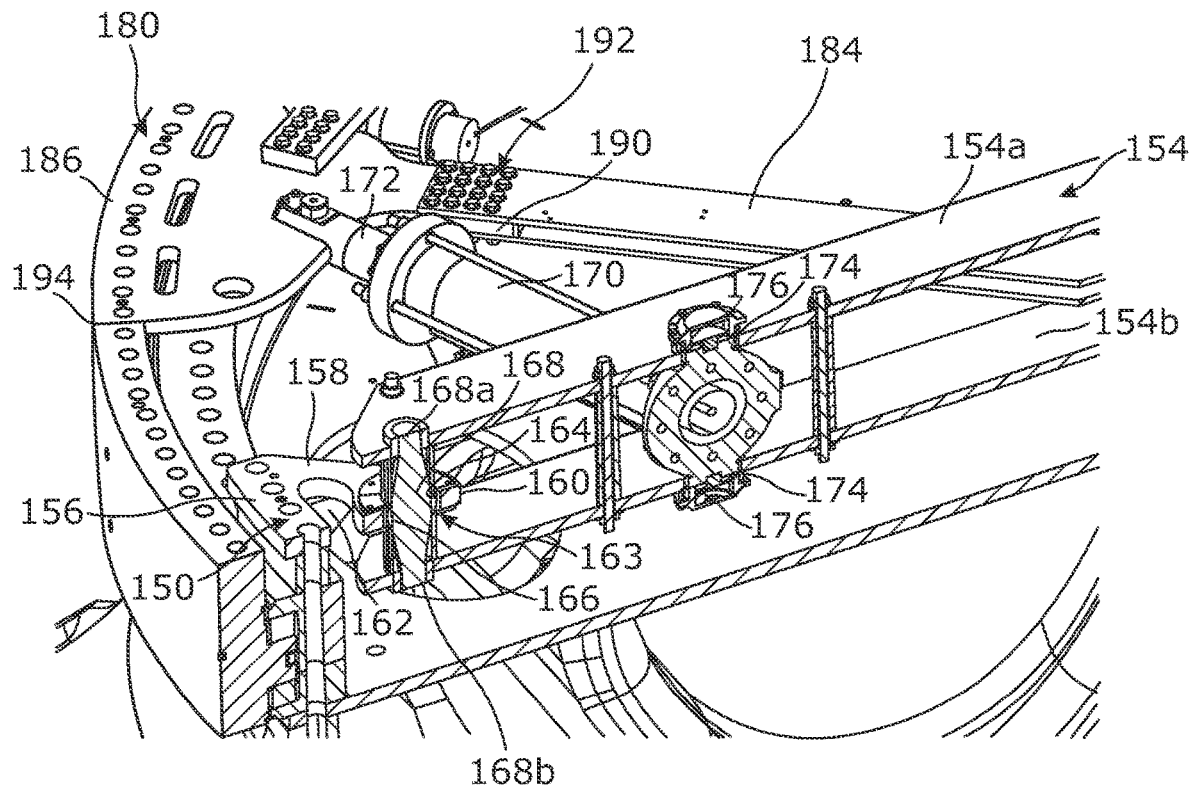

In order that the present invention may be more readily understood, embodiments of the invention will now be described, by way of non-limiting example, with reference to the remaining figures, in which:

FIG. 2 is a front view of a wind turbine according to the present invention including three blades attached to a central hub via respective pitch systems;

FIG. 3 is a perspective view of a pitch system in accordance with an embodiment of the invention;

FIG. 4 is a section view of the pitch system shown in FIG. 3;

FIG. 5 is another section view of the pitch system of FIG. 3; and

Figure 6:
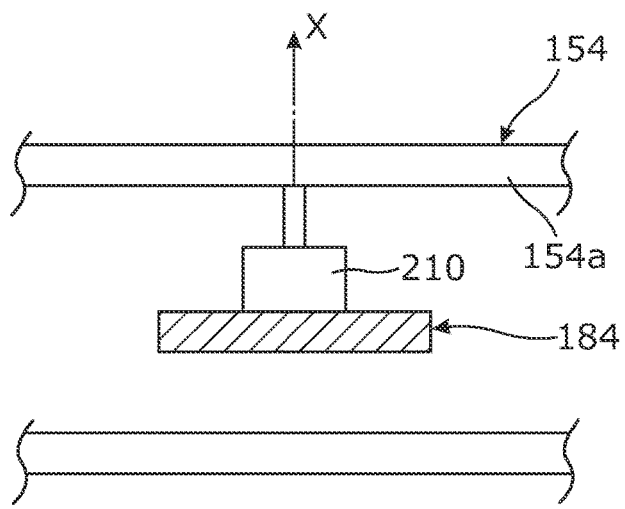

FIG. 6 is a schematic view through a transverse section of the actuator system, illustrating a possible configuration of a sensor system.

DETAILED DESCRIPTION OF THE EMBODIMENTS

FIG. 2 is a front view of a wind turbine 100 according to the present invention. The wind turbine 100 comprises a tower 102, a nacelle 104 located at the top of the tower 102, and a rotor-hub assembly 106 mounted to the nacelle 104. The rotor-hub assembly 106 comprises three turbine blades 108 affixed to a central hub 110. The blades 108 are arranged to cause rotation of the rotor-hub assembly 106 when wind is incident on the blades 108. The central hub 110 is connected to a main shaft housed in the nacelle 104, which in turn is connected to a generating system (not shown) also in the nacelle 104. The central hub 110 causes the main shaft to turn and this rotational energy is converted into electricity by the generating system.

Figure 1:
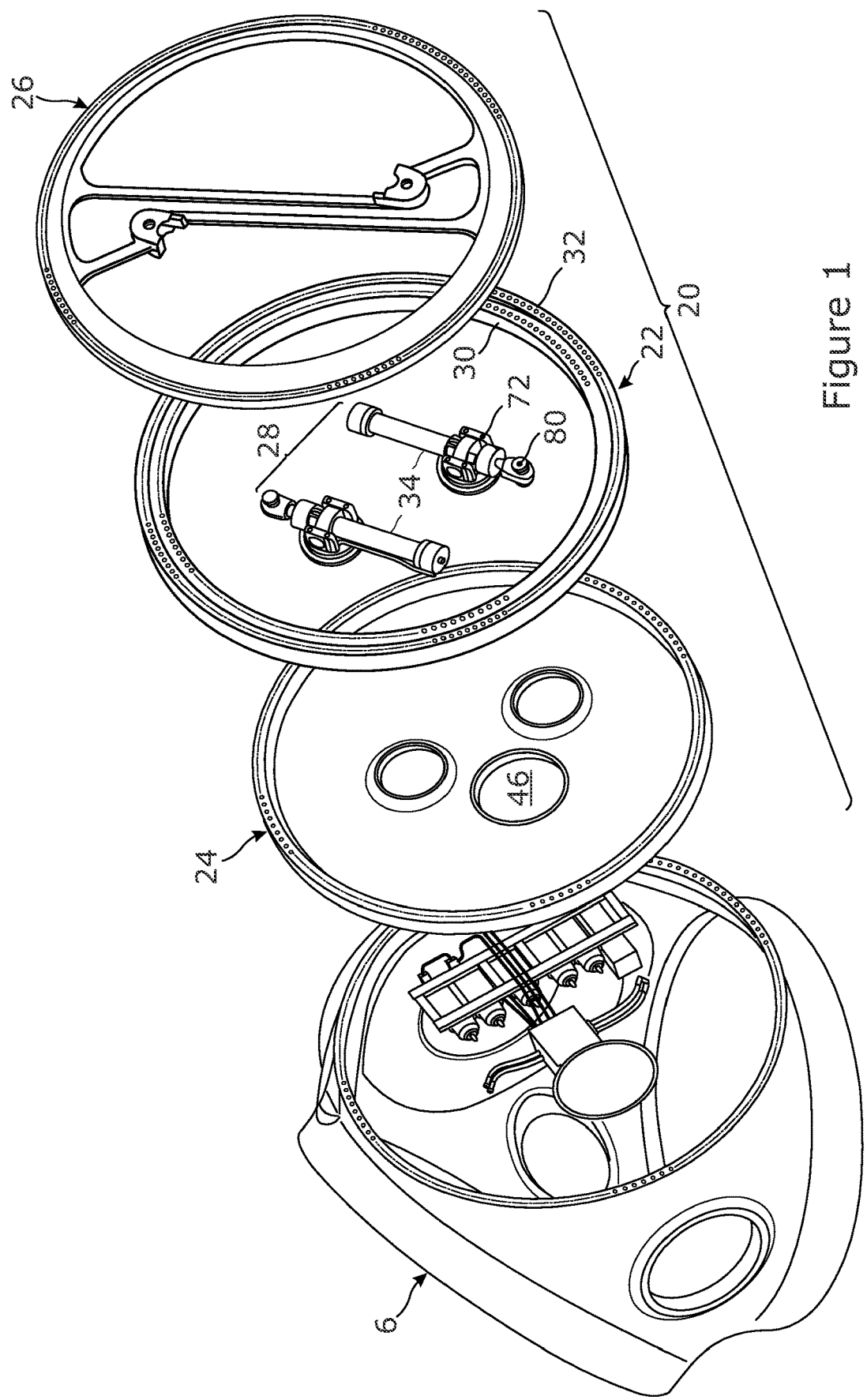
FIG. 1 has already been described by way of background, which shows an exploded perspective view of a prior art pitch system for a wind turbine.

Each wind turbine blade 108 is mounted to the central hub 6 by a pitch system similar to the pitch system described by way of background with reference to FIG. 1. Accordingly, reference to FIG. 1 should be made for the general structure of the pitch system. Further details of the pitch system can be found in WO 2012/069062, the content of which is hereby incorporated by reference.

With reference to FIG. 3, a pitch system 112 in accordance with an embodiment of the invention includes a blade bearing arrangement or assembly 114 that is mounted to the central hub 110. The hub 110 can be seen in the lower part of FIG. 3, with the bearing arrangement 114 mounted to it. It will be appreciated that the blade bearing arrangement 114 is just one of such arrangements that are mounted to the hub 110, there being one per blade.

The blade bearing arrangement 114 or, more simply, blade bearing, comprises a first bearing ring 120 and a second bearing ring 122 that are configured to rotate with respect to one another. For the purposes of this discussion, the first bearing ring 120 will be referred to as the inner bearing ring, and the second bearing ring 122 will be referred to as the outer bearing ring.

The inner and outer bearing rings 120, 122 may be arranged with conventional rolling elements such as cylindrical or tapered rollers between them in the usual way for such an application. The specific form of rolling elements or equivalent friction reduction means between the inner and outer bearing rings 120, 122 is not critical to the invention and so no further discussion will be provided here. The inner and outer bearing rings 120, 122 are oriented about and therefore define a rotational axis X for the blade bearing, which is shown in FIG. 3 as extending vertically up the page.

In the illustrated embodiment, the inner bearing ring 120 is fixed to the hub 110 by suitable fixings such as bolts and so it is rotationally coupled to the hub 110. Note that the fixings are not shown in the Figures, although a ring of bolt holes 123 is shown. Typically, the inner bearing ring 120 will be a separate part to the hub 110 and fixed securely to it, as this provides for more convenient manufacture. However, the inner bearing ring 120 may also be an integral part of the hub 110, such that it may be cast and/or machined from the same piece of material e.g. cast steel.

In the illustrated embodiment, the outer bearing ring 122 rotates relative to the inner bearing ring 120 and so is suitable for being connected to a blade so that the rotational positional of the outer bearing ring 122 can control the pitch angle of the blade. In FIG. 3, the outer bearing ring 120 defines a ring of bolt holes 124 about its circumferential edge which serve as fixing points for a blade as would be understood by the skilled person. The blade and relevant fixings are not shown here. Beneficially, since the outer bearing ring 122 is fixed to the blade, in use, this means that for a blade root of a given diameter, the inner bearing ring 120 is of a smaller diameter which, in turn, means that the hub can be more compact.

The pitch system 112 includes an actuation system 130 which has a function of controlling relative movement between the inner and outer bearing rings 120,122. A challenge with conventional actuation systems, as may be seen in WO2012/069062, is to provide a sufficiently stiff connection between the inner bearing ring and the outer bearing ring. A stiff connection is important because it resists torsional loads imposed by the blades during wind gusts, for example, which try to rotate the blade bearing and which can result in an induced pitch error. A less stiff connection may occur due to excessive elastic deformation of the parts involved in the load paths between the inner and outer blade bearings and the actuation components of the pitch system.

The pitch system 112 of the invention provides an advantageously stiff connection which results in a more accurate pitch actuation and reduces bearing wear. The pitch system 112 of the invention also realises a mass reduction compared to conventional approaches since it enables a simplified design to be used which can avoid the use of a large and expensive cast-iron hub plate as is conventional designs, and as shown in WO2012/069062.

Returning to FIG. 3, the actuation system 130 includes a first load transfer beam arrangement 132 and a second load transfer beam arrangement 134, that together provide a rotationally drivable coupling between the inner and outer bearing rings 120, 122. As can be seen in FIG. 3, the first load transfer beam arrangement 132 is generally linear, in this embodiment, and spans between a first fixing position 136 and a second fixing position 138 on the inner bearing ring 120. The two fixing positions 136,138 are separate and are diametrically opposed in this embodiment.

In a similar manner to the first load transfer beam arrangement 132, the second load transfer beam arrangement 134 is also generally linear and spans between a first fixing position 140 and a second fixing position 142 on the outer bearing ring 122. The two fixing positions 140,142 of the second load transfer beam arrangement 134 are also separate and diametrically opposed in the illustrated embodiment.

The actuation system 130 includes a pair of linear actuators 146, in the illustrated embodiment, which are coupled between the first and second load transfer beam arrangements 132, 134 and are arranged to create an angular force on the second load transfer beam arrangement 134 when operated. In this way, the outer bearing ring 122 is controlled to move rotationally with respect to the inner bearing ring 120. Here, it should be noted that a pair of linear actuators 146 are provided as this generates a more evenly distributed force on the outer bearing ring 122. Furthermore, this means that smaller actuators can be used rather than a single actuator with a larger load capacity. It is possible for the linear actuators to be embodied as pneumatic or electrically driven linear actuators, for example based on a lead screw mechanism, but for high load applications hydraulic actuators are more suitable.

Each of the first and second load transfer beam arrangements 132, 134 includes respective mounting brackets by which means they are connected between the inner and outer bearing rings 120, 122, respectively.

More specifically, the first load transfer beam arrangement 132 comprises a first mounting bracket 150, a second mounting bracket 152, and a beam or strut 154 that is coupled to and extends between the first and second mounting brackets 150, 152. The beam 154 is shown here as a compound beam, and so includes a pair of beam sections 154a, 154b although a single beam section would also be acceptable. However, a twin beam arrangement has certain load sharing advantages that will become apparent in the discussion that follows.

As can be seen in the Figures, the mounting brackets 150, 152 of the first load transfer beam arrangement 132 serve to couple respective ends of the pair of beam sections 154a, 154b to the inner bearing ring 120. Although both of the mounting brackets 150,152 are shown in FIG. 3, a section view through one of the mounting brackets 150 is shown in FIG. 5. It will be appreciated that the mounting bracket 150 is generally annular in form and comprises a bracket base 156 and two arms 158 that converge at an apex that defines a connecting portion 160 of the mounting bracket 150. The base 156 and the arms 158 therefore provide a generally annular, and more specifically a triangular form, of bracket that defines an open central area/aperture 162. Here, the central aperture is relatively large so as to define the relatively slender bracket base 156 and arms 158. The configuration of the bracket 150 provides it with a degree of flexibility, particularly in a radial direction. This flexibility is able to provide some decoupling between the ovalisation of the of the inner bearing ring 120 and the beam section 154 which reduces material fatigue whilst retaining acceptable stiffness for effective actuation of the linear actuators.

The mounting bracket 150 is connected to the beam sections 154a, 154b at its connecting portion 160, where there is formed a bearing support 163. The bearing support 163 is defined by an aperture 164 which receives a spherical bearing 166 that is connected to a mounting spindle or pin 168. The mounting pin 168 extends through the spherical bearing 166 and is fixed at each of its ends 168a, 168b to an end of the respective beam sections 154a, 154b. The arrangement of the spherical bearing 166 therefore provides the beam 154 with the ability to accommodate geometry changes as the actuators drive the outer bearing ring 122. The bearing support 163 therefore provides at least two degrees of freedom in this case, including at least a rotational degree of freedom, which allows the beam sections 154a, 154b to rotate and tilt with respect to the mounting bracket 150.

Note that the second mounting bracket 152 has the same structure as the first mounting bracket 150 in this illustrated embodiment, so for the sake of brevity further description will not be provided.

As can be seen in the Figures, the beam 154 of the first load transfer beam arrangement 132 provides a mounting point for the pair of linear actuators 146. In this example, the linear actuators 146 are hydraulic and comprise an actuator body 170 and an actuator rod 172 that is slidable in a barrel (not shown) defined in the actuator body 170 in the conventional manner. Here, the actuator bodies 170 are connected to the beam 154 and the actuator rods 172 are connected to the second load transfer beam arrangement 134.

Referring to FIGS. 4 and 5 particularly, in which the connection between the beam 154 and one of the actuators 146 can be viewed clearly, it can be seen that the actuator body 170 is embraced by the two beam sections 154a, 154b which in effect acts as a flexible yoke-type coupling for the actuator body 170 which is supported by the beam sections 154a, 154b so that it is able to move angularly in a direction that is generally perpendicular to the rotational axis X of the blade bearing. Any suitable bearing may be used to rotatably support the actuator body 70. In FIGS. 4 and 5, it can be seen that the actuator body 170 includes a pair of opposed mounting lugs 174, oriented vertically in the figures, that are received into respective sockets 176 defined in the beam sections 154a, 154b. This configuration of mounting therefore enables the actuator body 170 to swing sideways through a first degree of freedom, that being a rotational degree of freedom, in a plane parallel to the plane defined by the blade bearing which therefore provides a flexible coupling. The interface between the sockets 176 and the mounting lugs 174 may also be embodied as a bearing that provides multiple degrees of freedom such as a spherical bearing or a cardanic type joint arrangement.

An advantage of the first load transfer beam arrangement 132 is that it provides radial stiffness between its diametrically-opposed mounting brackets 150, 152, thereby resisting ovalisation of the respective inner bearing ring 120, whilst having beneficial torsional flexibility since the beam 154 is able to twist about its longitudinal axis. In use, the inner and outer bearing rings 120, 122 deform slightly due to the loads they are subjected to by the blade. This means that the actuators 146 may be pulled out of alignment with the bearing plane but they must still be able to function by applying pitching loads to the bearing. The torsional flexibility of the beam 154 means that the two actuators are able to move out of plane independently from one another whilst still functioning to apply force to the outer bearing ring 122. A parallel beam arrangement of a pair of beam sections 154a, 154b as shown in the figures provides an elegantly simply implementation that is torsionally flexible, although it is still comparatively stiff to in-plane moments, e.g. bending forces and radial forces, and provides a strong yoke-like mounting for the actuators. In the illustrated embodiment, the beam 154 comprises at least one beam member or section that extends along a longitudinal axis, and which is longer in that axial direction compared to its width and thickness directions which are transverse to the longitudinal axis of the beam. Other configurations are still possible, however. For example, a tube-like beam would provide high stiffness against bending and radial forces, and could be configured with a rotational bearing at a point along its length to provide torsional flexibility. However, such a configuration would be comparatively complex due to the requirement for an additional rotational bearing. Similar results could in theory be achieved with beams having box-like or tube-like sectional profiles, but the walls of such beams would need to be configured with suitable formations such as slots and apertures to impart the required flexibility. Once again, such configurations would have increased complexity compared to the elegant form of the illustrated embodiment.

Turning to the second load transfer beam arrangement 134, this component also includes a first mounting bracket 180 and a second mounting bracket 182, and a beam or strut 184 that is coupled between them. However, in this case the two mounting brackets 180, 182 are coupled to the outer bearing ring 122. Since the beam 184 is linear, in the illustrated embodiment, the first and second mounting brackets 180,182 of the second load transfer beam arrangement 134 are in approximately diametrically opposed locations. It should be noted that the beam 184 may be a single beam or it may comprise a pair of beam sections, as is seen particularly clearly in FIG. 5, which may be easier to mount on its respective mounting brackets.

As can be seen in the figures, the outer bearing ring 122 has a taller configuration than the inner bearing ring 120, such that an axial end face of the outer bearing ring 122 is spaced from the axial end face of the inner bearing ring 120. This comparative configuration guards against possible clashing between the bolts (not shown) on the inner bearing ring and the underside of the second load transfer beam arrangement when it rotates.

Notably, due to the linear configurations of the first and second load transfer beam arrangements 132,134 which each extend between diametrically opposed locations on the inner and outer bearing ring, respectively, it will be appreciated that the beam 184 of the second load transfer beam arrangement 134 crosses the first load transfer beam arrangement 132, when viewed along the rotational axis X of the pitch system 112. More particularly, the two beams 154, 184 cross at a point that is substantially coincident with the geometric centre of the blade bearing, as denoted by the rotational axis X.

The compound configuration of the beam sections 154a, 154b of the first load transfer beam arrangement 132 is particularly beneficial here since the beam 184 of the second load transfer beam arrangement 134 is able to pass through the space between the parallel beam sections 154a, 154b.

The mounting brackets 180, 182 of the second load transfer beam arrangement 134 are shown in FIG. 3, but are also illustrated in FIGS. 4 and 5 in more detail. Each of the mounting brackets 180,182 is identical in form, so only one of them will be described in detail, with reference to FIGS. 4 and 5.

The mounting bracket 180 is plate-like in form and provides an interface to bridge between the beam 184 and the outer bearing ring 122. The mounting bracket 180 has a base section 186 which is coupled to the outer bearing ring 122 at a series of bolting locations, and an intermediate tapered portion that terminates in a connecting tongue 190 which is secured to an end of the beam 184. As shown here, the connection between the connecting tongue 190 and the beam 184 is by way of an array of bolts 192, but other connection methods would be acceptable, as would be understood by the skilled person.

It will be appreciated from the figures that the mounting bracket 180 fixes to the outer bearing ring 122 in such a way so that the outer bearing ring 122 maintains a flat and uniform contact face for connecting to the blade. To this end, the outer bearing ring 122 is shaped to define a first and second cut-out or 'recessed' sections 194 (best seen in FIG. 4) which are shaped to match the respective base sections 186 of the mounting brackets 180, 182. The cut-out sections 194 have a depth which matches the thickness of the respective mounting bracket 180, 182. As a result, the upper surface of the mounting brackets 180, 182, and particularly the base section 186 thereof, sit substantially flush with the adjacent surface of the outer bearing ring 122. Together therefore, the axial facing surfaces of the outer bearing ring 122 and the connector brackets 180, 182 provide a flat surface against which an abutting joining surface of a blade can be fixed. It should be noted that the recessed sections 194 should be considered optional. In an alternative embodiment, the outer bearing ring 122 is not provided with recessed sections and, instead, an intermediate component is provided to provide an interface between the axial end face of the outer bearing rind and the root end of the blade. That interface component would suitably be shaped to accommodate the protruding mounting brackets of the second load transfer beam arrangement.

Whereas the first load transfer beam arrangement 130 is coupled to the bodies of the linear actuators 146, the second load transfer beam arrangement 132 is coupled to the actuator rods 172. More specifically the actuator rods 172 of each of the linear actuators 146 are connected to respective ones of the mounting brackets 180,182, and the coupling between these components can be seen clearly in FIGS. 4 and 5. Although not shown in the figures, it should be noted that the actuator rods 172 are coupled to the respective mounting brackets 180,182 by a suitable coupling 183 that provides at least a rotational degree of freedom of movement, e.g. so that the actuator rod is able to swing angularly in the plane of the mounting bracket as the inner and outer bearing rings 120, 122 rotate relative to one another. A more complex bearing arrangement may be provided (e.g. a spherical bearing) to provide more than one degree of movement.

As can be seen from FIG. 3 particularly clearly from FIG. 3, the configuration of the first and second load transfer beam arrangements 132, 134 and the connection with the linear actuators 146 means that the linear actuators 146 are oriented in a parallel relationship. This is advantageous with both actuators 146 apply a force on the outer bearing ring 122 when they are operated which is balanced across opposing sides of the outer bearing ring 122. Using two linear actuators is advantageous for various reasons. For example, in the case of hydraulic actuators using two actuators means that the actuators can have a simpler design and there are more common parts. Furthermore, both actuators can be connected to a common hydraulic source which ensures that each actuator applies the same force.

In an augmentation of the illustrated embodiment, the actuator arrangement 130 of the invention may be equipped with a suitable sensor system (not shown in FIGS. 3-5) to measure the extent of relative movement between the first load transfer beam arrangement 132 and the second load transfer beam arrangement 134. One way in which this may be achieved is shown schematically in FIG. 6, in which a rotary transducer 210 is coupled between the beam 154 of the first lead transfer beam arrangement 132 and the beam 184 of the second load transfer beam arrangement 134. The rotary transducer 210 may be coupled between the two beams 154, 184, as shown here, such that a rotary input 212 is attached to the upper beam section 154a and is aligned with the rotational axis X of the pitch system. This would provide a suitable location because the rotary transducer 210 would experience relative rotation between the beams 154, 184, but not a relative translation. Such an arrangement would be beneficial because it would avoid a more complex transducer/encoder system mounted between the inner and outer bearing rings.

The skilled person would appreciate that the illustrated embodiment is one example of how the invention may be put into effect. Accordingly, the embodiment described herein is provided purely for illustrative purposes and is not to be construed as limiting the scope of the invention. Some variations of the illustrated embodiments have been described above, but the skilled person would understand that other variants are possible without departing from the invention as defined by the claims.

The invention claimed is:

1. A pitch system for rotating a blade of a wind turbine relative to a hub, the pitch system comprising:
   a blade bearing including an inner bearing ring and an outer bearing ring, wherein the outer bearing ring is rotatable relative to the inner bearing ring, and
   an actuator system configured to control relative rotational movement between the inner bearing ring and outer bearing ring, comprising:
      a first load transfer beam arrangement spanning at least first and second fixing positions associated with the inner bearing ring,
      a second load transfer beam arrangement spanning at least first and second fixing positions associated with the outer bearing ring, and
      a first linear actuator coupled between the first load transfer beam arrangement and the second load transfer beam arrangement,
   wherein the first load transfer beam arrangement is connected to the inner bearing ring at the first and second fixing positions by respective first and second mounting brackets, and
   wherein the first load transfer beam arrangement is connected to at least one of the first and second mounting brackets by a respective beam coupling having at least a rotational degree of freedom.

2. The pitch system of claim 1, wherein the inner bearing ring is configured to be mounted to the hub.

3. The pitch system of claim 1, wherein the outer bearing ring is configured to be mounted to the blade.

4. The pitch system of claim 1, wherein the first load transfer beam arrangement crosses the second load transfer beam arrangement, when viewed along a rotational axis (X) of the pitch system.

5. The pitch system of claim 1, wherein the first load transfer beam arrangement extends substantially linearly between the first and second fixing positions associated with the inner bearing ring.

6. The pitch system of claim 1, wherein the second load transfer beam arrangement extends substantially linearly between the first and second fixing positions associated with the outer bearing ring.

7. The pitch system of claim 1 wherein the first and second fixing positions associated with the outer bearing ring and/or the first and second fixing positions associated with the inner bearing ring respectively are diametrically opposed to one another.

8. The pitch system of claim 1, wherein the linear actuator has an actuator body mounted to the first load transfer beam arrangement and an actuator rod connected to the second load transfer beam arrangement.

9. The pitch system of claim 8, wherein the actuator body is connected to the first load transfer beam arrangement by way of a coupling having at least a rotational degree of freedom.

10. The pitch system of claim 8, wherein the actuator rod is connected to the second load transfer beam arrangement by way of a coupling having at least a rotational degree of freedom.

11. The pitch system of claim 1, wherein at least one of the mounting brackets defines an open central area.

12. The pitch system of claim 11, wherein at least one of the mounting brackets has a bracket base that is connected to the inner bearing ring and a pair of converging connector arms that connect to a beam of the first load transfer beam arrangement.

13. The pitch system of claim 1, wherein the first load transfer beam arrangement comprises a first beam section and a second beam section.

14. The pitch system of claim 13, wherein the first and second beam sections are parallel to one another.

15. The pitch system of claim 14, wherein the second load transfer beam arrangement extends between the first and second beam sections.

16. The pitch system of claim 14, wherein the first linear actuator is positioned between the first and second beam sections.

17. The pitch system of claim 1, further comprising a sensor system coupled between the first load transfer beam arrangement and the second load transfer beam arrangement and configured to measure relative rotational movement between them.

18. The pitch system of claim 1, further comprising a second linear actuator coupled between the first load transfer beam arrangement and the second load transfer beam arrangement.

19. The pitch system of claim 18, wherein the first and second linear actuators are coupled between the first and second load transfer beam arrangements so as to extend parallel to one another.

20. A pitch system for rotating a blade of a wind turbine relative to a hub, the pitch system comprising:
   a blade bearing including an inner bearing ring and an outer bearing ring, wherein the outer bearing ring is rotatable relative to the inner bearing ring, and
   an actuator system configured to control relative rotational movement between the inner bearing ring and outer bearing ring, comprising:
      a first load transfer beam arrangement spanning at least first and second fixing positions associated with the inner bearing ring, a second load transfer beam arrangement spanning at least first and second fixing positions associated with the outer bearing ring, and a first linear actuator coupled between the first load transfer beam arrangement and the second load transfer beam arrangement, wherein the second load transfer beam arrangement is connected to the outer bearing ring at the first and second fixing positions by respective first and second mounting brackets, and wherein the outer bearing ring defines a recessed section which mates with a base part of the respective first or second mounting brackets so that an upper surface of the base part is flush with an adjacent surface of the outer bearing ring.

21. A pitch system for rotating a blade of a wind turbine relative to a hub, the pitch system comprising:

a blade bearing including an inner bearing ring and an outer bearing ring, wherein the outer bearing ring is rotatable relative to the inner bearing ring, and an actuator system configured to control relative rotational movement between the inner bearing ring and outer bearing ring, comprising:

a first load transfer beam arrangement spanning at least first and second fixing positions associated with the inner bearing ring, a second load transfer beam arrangement spanning at least first and second fixing positions associated with the outer bearing ring, and a first linear actuator coupled between the first load transfer beam arrangement and the second load transfer beam arrangement, wherein the first load transfer beam arrangement comprises a first beam section and a second beam section, and wherein the second load transfer beam arrangement extends between the first and second beam sections.

22. A pitch system for rotating a blade of a wind turbine relative to a hub, the pitch system comprising:

a blade bearing including an inner bearing ring and an outer bearing ring, wherein the outer bearing ring is rotatable relative to the inner bearing ring, and an actuator system configured to control relative rotational movement between the inner bearing ring and outer bearing ring, comprising:

a first load transfer beam arrangement spanning at least first and second fixing positions associated with the inner bearing ring, a second load transfer beam arrangement spanning at least first and second fixing positions associated with the outer bearing ring, and a first linear actuator coupled between the first load transfer beam arrangement and the second load transfer beam arrangement, wherein the first load transfer beam arrangement comprises a first beam section and a second beam section, and wherein the first linear actuator is positioned between the first and second beam sections.

23. A pitch system for rotating a blade of a wind turbine relative to a hub, the pitch system comprising:

a blade bearing including an inner bearing ring and an outer bearing ring, wherein the outer bearing ring is rotatable relative to the inner bearing ring, and an actuator system configured to control relative rotational movement between the inner bearing ring and outer bearing ring, comprising:

a first load transfer beam arrangement spanning at least first and second fixing positions associated with the inner bearing ring, a second load transfer beam arrangement spanning at least first and second fixing positions associated with the outer bearing ring, and a first linear actuator coupled between the first load transfer beam arrangement and the second load transfer beam arrangement, wherein the first load transfer beam arrangement is connected to the inner bearing ring at the first and second fixing positions by respective first and second mounting brackets, and wherein the first load transfer beam arrangement is connected to at least one of the first and second mounting brackets by a respective beam coupling having at least a rotational degree of freedom about a longitudinal axis between the first and second fixing positions associated with the inner bearing ring.

24. The pitch system of claim 23, wherein the first load transfer beam arrangement is connected to the inner bearing ring at the first and second fixing positions by respective first and second mounting brackets.

25. The pitch system of claim 24, wherein the first load transfer beam arrangement is connected to at least one of the first and second mounting brackets by a respective beam coupling having at least a rotational degree of freedom.

26. The pitch system of claim 23, wherein the second load transfer beam arrangement is connected to the outer bearing ring at the first and second fixing positions by respective first and second mounting brackets, and wherein the outer bearing ring defines a recessed section which mates with a base part of the respective first or second mounting brackets so that an upper surface of the base part is flush with an adjacent surface of the outer bearing ring.

* * * * *